United States Patent
Khirman et al.

(10) Patent No.: US 11,935,238 B2
(45) Date of Patent: Mar. 19, 2024

(54) SYSTEMS AND METHODS FOR GENERATING CLINICALLY RELEVANT IMAGES THAT PRESERVE PHYSICAL ATTRIBUTES OF HUMANS WHILE PROTECTING PERSONAL IDENTITY

(71) Applicant: RealizeMD Ltd., Givatayim (IL)

(72) Inventors: Stanislav Khirman, Jerusalem (IL); Uri Neeman, Tel-Aviv (IL); Alon Gat, Tel-Aviv (IL); David P. Rapaport, Tel-Aviv (IL)

(73) Assignee: RealizeMD Ltd., Givatayim (IL)

( * ) Notice: Subject to any disclaimer, the term of this patent is extended or adjusted under 35 U.S.C. 154(b) by 0 days.

(21) Appl. No.: 18/135,283

(22) Filed: Apr. 17, 2023

(65) Prior Publication Data

US 2023/0252627 A1    Aug. 10, 2023

Related U.S. Application Data

(63) Continuation-in-part of application No. 17/960,881, filed on Oct. 6, 2022, now Pat. No. 11,631,208.
(Continued)

(51) Int. Cl.
    *G06T 7/00*      (2017.01)
    *G06T 5/50*      (2006.01)
(Continued)

(52) U.S. Cl.
CPC .............. *G06T 7/0012* (2013.01); *G06T 5/50* (2013.01); *G06T 7/11* (2017.01); *G06V 10/25* (2022.01);
(Continued)

(58) Field of Classification Search
CPC ........... G06T 7/0012; G06T 7/11; G06T 5/50; G06V 10/25; G06V 10/761; G06V 10/44; G06V 10/46
See application file for complete search history.

(56) References Cited

U.S. PATENT DOCUMENTS 10,716,192 B1 *   7/2020   Tsibulevskiy ......... H02J 7/0049
11,354,532 B1 *   6/2022   Stancil .................. G06V 20/40
(Continued)

FOREIGN PATENT DOCUMENTS

WO    WO 2023/119270      6/2023

OTHER PUBLICATIONS

International Search Report and the Written Opinion dated Mar. 6, 2023 From the International Searching Authority Re. Application No. PCT/IL2022/051341 (14 Pages).
(Continued)

*Primary Examiner* — Kevin Ky

(57) ABSTRACT

There is provided a method of generating a dataset of synthetic images, comprising: for each real image each depicting a real human anatomical structure: extracting and preserving a real anatomical structure region(s) from the real image, generating a synthetic image comprising a synthetic human anatomical structure region and the preserved real anatomical structure region(s), designating pairs of images, each including the real image and the synthetic image, feeding the pair into a machine learning model trained to recognize anatomical structure parts to obtain an outcome of a similarity value denoting an amount of similarity between the real image and the synthetic image, verifying that the synthetic image does not depict the real human anatomical structure when the similarity value is below a threshold, wherein an identity of the real human anatomical structure is non-determinable from the synthetic image, and including the verified synthetic image in the dataset.

10 Claims, 7 Drawing Sheets

Related U.S. Application Data

(60) Provisional application No. 63/292,507, filed on Dec. 22, 2021.

(51) Int. Cl.

| | | |
|---|---|---|
| *G06T 7/11* | (2017.01) | |
| *G06V 10/25* | (2022.01) | |
| *G06V 10/44* | (2022.01) | |
| *G06V 10/46* | (2022.01) | |
| *G06V 10/74* | (2022.01) | |

(52) U.S. Cl.
CPC .............. *G06V 10/44* (2022.01); *G06V 10/46* (2022.01); *G06V 10/761* (2022.01); *G06T 2207/20084* (2013.01); *G06T 2207/20221* (2013.01); *G06T 2207/30104* (2013.01)

(56) References Cited

U.S. PATENT DOCUMENTS

| | | | | |
|---|---|---|---|---|
| 2016/0086500 | A1* | 3/2016 | Kaleal, III | A61B 5/45 |
| | | | | 434/257 |
| 2016/0167672 | A1* | 6/2016 | Krueger | G16H 40/63 |
| | | | | 340/576 |
| 2016/0171198 | A1* | 6/2016 | John Archibald | G06F 21/577 |
| | | | | 726/19 |
| 2016/0295170 | A1* | 10/2016 | White | H04N 21/812 |
| 2018/0060639 | A1* | 3/2018 | Lee | G06V 40/13 |
| 2018/0107866 | A1* | 4/2018 | Li | G06V 40/172 |
| 2019/0333219 | A1* | 10/2019 | Xu | G06T 11/008 |
| 2020/0211409 | A1* | 7/2020 | Latorre | G16H 10/60 |
| 2020/0364864 | A1* | 11/2020 | Shanbhag | G06T 11/008 |
| 2021/0002331 | A1* | 1/2021 | Jakobsen | A61K 51/084 |
| 2021/0065881 | A1* | 3/2021 | Sargent | G16H 30/40 |
| 2021/0107977 | A1* | 4/2021 | Bebbington | A61P 11/00 |
| 2021/0204023 | A1* | 7/2021 | Knox | H04N 21/42201 |
| 2021/0230777 | A1* | 7/2021 | Reed | D01F 1/10 |
| 2021/0241035 | A1* | 8/2021 | Sutherland | G06V 10/7784 |
| 2021/0251541 | A1* | 8/2021 | Weatherhead | A61B 5/4884 |
| 2021/0310082 | A1* | 10/2021 | Shoseyov | A01H 5/12 |
| 2021/0314526 | A1* | 10/2021 | Astarabadi | H04L 9/0819 |
| 2022/0392126 | A1* | 12/2022 | van der Meulen | G16H 30/20 |

OTHER PUBLICATIONS

Notice of Allowance dated Feb. 9, 2023 from the US Patent and Trademark Office Re. U.S. Appl. No. 17/960,881. (8 pages).
Official Action dated Jan. 3, 2023 from the US Patent and Trademark Office Re. U.S. Appl. No. 17/960,881. (22 pages).
Abdal et al. "StyleFlow: Attribute-conditioned Exploration of StyleGAN-Generated Images using Conditional Continuous Normalizing Flows", arXiv.org, Computer Science—Computer Vision and Pattern Recognition; Computer Science—Graphics:1-22, Aug. 2020.
Amazone "Machine Learning Image and Video Analysis—Amazon Rekognition", Amazon Web Services, 12P.2022.
Face Detector "DLIB Facial Landmarks Detection", 2.P.
Karras et al. "A Style-Based Generator Architecture for Generative Adversarial Networks", IEEE/CVF Conference on Computer Vision and Pattern Recognition (CVPR):4396-4405, Jun. 15-20, 2019.
Karras et al. "Alias-Free Generative Adversarial Networks", arXiv.org; Computer Science; Computer Vision and Pattern Recognition, 1-31, Jun. 23, 2021.
Karras et al. "Analyzing and Improving the Image Quality of StyleGAN", arXiv.org Computer Science > Computer Vision and Pattern Recognition: 1-21, Dec. 3, 2019.
Karras et al. "Analyzing and Improving the Image Quality of StyleGAN", IEEE/CVF Conference on Computer Vision and Pattern Recognition (CVPR): 21P., Jun. 13-19, 2020.
Media Pipe "Media Pipe Face Mesh", Media Pipe, 18P., 2020.
Nitzan et al. "Face Identity Disentanglement via Latent Space Mapping", arXiv.org, Computer Science > Computer Vision and Pattern Recognition: 1-23, May 15, 2020.
Open CV "Seamless Cloning", Open Source Computer Vision, 4p., Dec. 21, 2020.
Perez et al. "Poisson Image Editing", ACM Transactins on Graphics, 22(3):313-318, Published Online Jul. 1, 2003.
Reinhard et al. "Color Transfer Between Images", IEEE Computer Graphics and Applications, 21(5) :34-41, Jul.-Aug. 2001.
Richardson et al. "Encoding in Style: a StyleGAN Encoder for Image-to-Image Translation", Computer Science, 21P., Aug. 2020.
Shen et al. "InterFaceGAN: Interpreting the Disentangled Face Representation Learned by GANs", IEEE Transactions on Pattern Analysis and Machine Intelligence, 16.P., Oct. 27, 2020.
Tov et al. "Designing an Encoder for StyleGAN Image Manipulation", ACM Transactions on Graphics, 40(4:1-33, Pblished Online Jul. 19, 2021.
Xia et al. "GAN Inversion: A Survey", arXiv.org , Computer Science > Computer Vision and Pattern Recognition, 1-21, Jan. 14, 2021.
Zhu et al. "In-Domain GAN Inversion for Real Image Editing", European Conference on Computer Vision':592-608, Nov. 19, 2020.

\* cited by examiner

SYSTEMS AND METHODS FOR GENERATING CLINICALLY RELEVANT IMAGES THAT PRESERVE PHYSICAL ATTRIBUTES OF HUMANS WHILE PROTECTING PERSONAL IDENTITY

RELATED APPLICATIONS

This application is a Continuation-in-Part (CIP) of U.S. patent application Ser. No. 17/960,881 filed on Oct. 6, 2022, which claims the benefit of priority under 35 USC § 119(e) of U.S. Provisional Patent Application No. 63/292,507 filed on Dec. 22, 2021. The contents of the above applications are all incorporated by reference as if fully set forth herein in their entirety.

FIELD AND BACKGROUND OF THE INVENTION

The present invention, in some embodiments thereof, relates to synthesis of images of anatomical structures and, more specifically, but not exclusively, to systems and methods for synthesizing anonymous images.

A generative adversarial network (GAN) is a type of machine learning model architecture that is trained to generate images that look real, but that are actually synthetic and do not depict any real-world scenario. GANs may generate images of anatomical structures of humans that look like real people, but are in fact synthetic.

SUMMARY OF THE INVENTION

According to a first aspect, a computer implemented method of generating a dataset of synthetic images depicting an anatomical structure region, comprises: for each real image of a plurality of real images each depicting a real human anatomical structure: extracting and preserving at least one real anatomical structure region from the real image of the real human anatomical structure, generating a synthetic image comprising a synthetic human anatomical structure region and the preserved at least one real anatomical structure region, designating pairs of images, each pair including the real image and the synthetic image that includes the preserved at least one real anatomical structure region extracted from the real image, feeding the real image and the synthetic image into a machine learning model trained to recognize anatomical structure parts to obtain an outcome of a similarity value denoting an amount of similarity between the real image and the synthetic image, verifying that the synthetic image does not depict the real human anatomical structure when the similarity value is below a threshold, wherein an identity of the real human anatomical structure is non-determinable from the synthetic image, and including the verified synthetic image in the dataset.

In a further implementation form of the first aspect, the method further comprises preserving at least one adaptable attribute of the anatomical structure of the real image in the synthetic image, wherein the at least one adaptable attribute is easily adapted by the real human anatomical structure.

In a further implementation form of the first aspect, segmenting comprises segmenting and preserving the at least one real anatomical structure region and at least one defined attribute from the real image, wherein the at least one defined attribute comprises a physical feature extracted from the real image.

In a further implementation form of the first aspect, generating the synthetic image comprises: computing, for each respective real image, a respective set of real latent vectors within a latent space of a pretrained generative adversarial network (GAN) using a GAN inversion approach, analyzing each respective set of real latent vectors to identify data representing at least one adaptable attribute, computing, for each respective synthetic image depicting the synthetic human anatomical structure, a respective set of synthetic latent vectors within the latent space of the pretrained GAN using the GAN inversion approach, adapting each respective set of synthetic latent vectors, to include the data representing the at least one adaptable attribute obtained by the analysis of the respective set of real latent vectors, reconstructing each respective synthetic image from a corresponding respective set of adapted synthetic latent vectors, wherein each synthetic image that includes the respective synthetic image reconstructed from the respective set of adapted synthetic latent vectors depicts the at least one adaptable attribute, as depicted by the corresponding real image, wherein the at least one adaptable attribute is easily adapted by the real human anatomical structure, the at least one adaptable attribute selected from a group consisting of: body pose, limb pose, blood flow phase, muscle contraction or relaxation, and lighting.

In a further implementation form of the first aspect, the method further comprises: computing, for each respective real image of a plurality of real images of the same person, a respective set of real latent vectors within a latent space of a pretrained GAN using a GAN inversion approach, computing an aggregated set of real latent vectors from a plurality of sets of real latent vectors, searching a dataset of a plurality of records for a record having a similarity to the aggregated set of real latent vectors, wherein each record includes a set of synthetic latent vectors computed for a certain synthetic human anatomical structure, wherein the image of the synthesized anatomical structure created from the set of synthesized latent vectors of the similar record is used to generate the synthetic image.

In a further implementation form of the first aspect, the method further comprises: computing a plurality of sets of synthetic latent vectors, each respective set of synthetic latent vectors computed by adapting the set of synthesized latent vectors of the similar record according to a difference between the aggregated set of real latent vectors and a certain set of real latent vectors computed for a certain real image, wherein each respective synthetic anatomical structure of each respective synthetic image is created from a respective set of synthetic latent vectors.

In a further implementation form of the first aspect, a fully synthetic image of the synthetic human anatomical structure used for generating the synthetic image is created by feeding random input into a GAN that converts the random input into latent vectors within an intermediary latent space, and generates the synthetic human anatomical structure according to the latent vectors.

In a further implementation form of the first aspect, the method further comprises: extracting metadata from the real image, the metadata indicating a characteristic profile of the real human anatomical structure, accessing a dataset of synthetic images of synthetic human anatomical structures each associated with respective extracted metadata indicating a respective characteristic profile of the respective synthetic human anatomical structure, searching metadata of the synthetic images of the dataset for a similar match to the metadata of the real image, wherein the similar matching synthetic image is used for generating the synthetic image.

In a further implementation form of the first aspect, the method further comprises: designating pairs of images, each pair including one real image and one synthetic image, feeding a respective real image and a respective synthetic image into a machine learning model trained to recognize anatomical structures to obtain an outcome of a similarity value denoting an amount of similarity between the real image and the synthetic image, and verifying that the synthetic image does not depict the real human anatomical structure when the similarity value is below a threshold.

In a further implementation form of the first aspect, the synthetic image comprises a plurality of synthetic images depicting the same synthetic human anatomical structure, and further comprising: designating a plurality of image pairs, each image pair including the respective combinatorial selection of two of the plurality of synthetic images, feeding each respective image pair into a machine learning model trained to recognize anatomical structures to obtain an outcome of a similarity value denoting an amount of similarity between the pair of images, and verifying that the plurality of synthetic images depict the same identity of the same synthetic human anatomical structure when all of the similarity values are above a threshold.

According to a second aspect, a computer implemented method of generating at least one synthetic image, comprises: segmenting and preserving at least one real anatomical structure region from at least one real image of a real human anatomical structure, identifying at least one synthetic anatomical structure region of at least one synthetic image comprising a synthetic human anatomical structure, the at least one synthetic anatomical structure region corresponding to the segmented and preserved at least one real anatomical structure region, and generating at least one synthetic image by replacing the at least one synthetic anatomical structure region of the synthetic image with the segmented and preserved at least one real anatomical structure region, wherein an identity of the real human anatomical structure is non-determinable from the at least one synthetic image.

In a further implementation form of the second aspect, replacing comprises seamlessly stitching the segmented and preserved at least one real anatomical structure region within the corresponding at least one synthetic anatomical structure region of the synthetic image.

In a further implementation form of the second aspect, the method further comprises: obtaining an indication of a procedure that physically impacts the anatomical structure, and mapping the procedure to the at least one real anatomical structure region impacted by the procedure.

In a further implementation form of the second aspect, the at least one real image comprises at least two real images including at least one real image obtained before the procedure depicting the at least one real anatomical structure region before impact by the procedure, and at least one real image obtained after the procedure indicating the actual impact of the procedure on the at least one real anatomical structure region.

In a further implementation form of the second aspect, the method further comprises extracting measured relationships between features of the real human anatomical structure impacted by the procedure from each respective real image, and adapting the corresponding synthetic anatomical structure of the respective synthetic image to preserve the measured relationships.

In a further implementation form of the second aspect, the procedure is selected from a group consisting of: medical aesthetic procedure, dental procedure, plastic surgery, cosmetic, diet, fitness, hairstyle, piercing, tattoo, makeup, organ transplant, repair of congenital heart defects, treatment of a tumor, resection of part of the anatomical structure, and internal fixation of a bone fracture.

In a further implementation form of the second aspect, the at least one real anatomical structure region comprises boundary around a contour of the real human anatomical structure.

In a further implementation form of the second aspect, segmenting comprises applying a mask to the at least one real image to include desired pixels included in the at least one real anatomical structure region and excluding pixels that do not belong to the at least one real anatomical structure region.

According to a third aspect, a computer implemented method of generating at least one synthetic fundus image, comprises: extracting and preserving at least one real fundus region from at least one real image of a real human fundus, and generating at least one synthetic fundus image comprising a synthetic human fundus and the preserved at least one real fundus region, wherein an identity of the real human fundus is non-determinable from the at least one synthetic fundus image.

In a further implementation form of the third aspect, the extracted and preserved at least one real fundus region is selected from a group consisting of: fovea, one or more blood vessels, optic disc, macula, clinical abnormalities, congenital abnormalities, and anatomical abnormalities.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
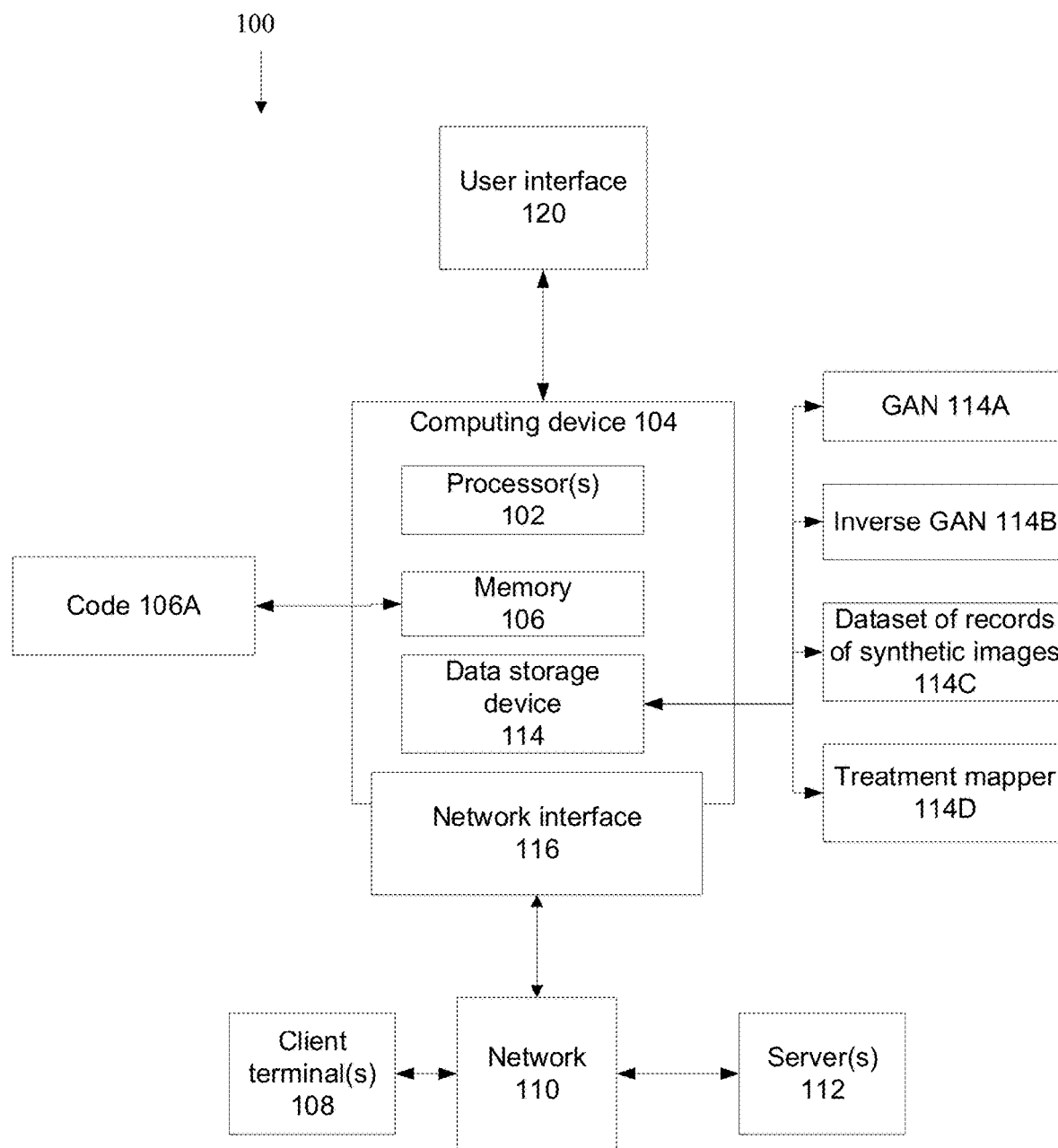
FIG. 1 is a block diagram of components of a system for generating one or more anonymous images that include a synthetic human anatomical structure and one or more real anatomical structure regions extracted and preserved from a real image of a real human, in accordance with some embodiments of the present invention.

The present invention, in some embodiments thereof, relates to synthesis of images of anatomical structures and, more specifically, but not exclusively, to systems and methods for synthesizing anonymous images.

As used herein, the terms synthetic image and avatar are interchangeable. The term anonymous image refers to a combination of a synthetic human anatomical structure image and real anatomical structure regions extracted from a real human anatomical structure image.

As used herein, the term anatomical structure, or region of the anatomical structure may refer to one or more of: one or more anatomical structures or portion(s) thereof, a region of the body, one or more entire organs, one or more partial organs, and/or tissues. The region of the anatomical structure may be an external surface of the body such as depicted by an image captured an image sensor that captures images at the visible light spectrum (e.g., camera, CMOS), for example, fundus, retina, arm, leg, chest, breast, back, face, or part thereof, and the like. Alternatively or additionally, the region of the anatomical structure may be an internal part of the body, such as one or more organs and/or tissues, as depicted by an image captured by an image sensor of an imaging modality that captures images of the interior of the body, for example, 2D x-ray, CT, MRI, ultrasound, optical coherence tomography, mammogram, PET scan, and the like. Examples of internal body anatomical structures, include: brain, heart, colon, stomach, bones, lung, liver, muscle, and the like.

As used herein, the terms anatomical structure, region of the anatomical structure, and body region, are interchangeable, and/or are used interchangeably.

As used herein, the term anatomical structure in the singular is not necessarily limited to a single anatomical structure, and may refer to multiple anatomical structures, and/or partial portions of anatomical structure(s).

As used herein, including the figures, reference to the term "face" is meant to serve as an example, and is not necessarily limited to the face. Other anatomical structure(s) may be substituted for the term "face".

An aspect of some embodiments of the present invention relates to systems, methods, an apparatus, and/or code instructions for generating one or more synthetic images, optionally a dataset of synthetic images depicting an anatomical structure region. The synthetic images are designed to be anonymous, even for anatomical structure regions (e.g., tissues, organs) that are not commonly known to carry protected health information (PHI), but do, for example, liver, brain, fundus, and the like, as described herein. For example, an image of the liver may depict features that are PHI, although commonly images of the liver are not used for identification of patients.

As used herein, the term synthetic image may be used interchangeably with the term anonymous image, The term synthetic image and/or anonymous image refers to an extension of anonymity so that when anatomical structure regions that are not intuitively carrying patients information but may in fact include PHI, are included, anonymity of the patient is in effect, regardless of the amount of features of the anatomical structure region that may be used to identify the patient.

One or more real anatomical structure regions are extracted and/or preserved from one or more real images of a human anatomical structure. The anatomical structure regions(s) may have been modified by a procedure, for example, plastic surgery, medical aesthetic interventions, cosmetic product applications and others as described herein. The real images may include a pre-feature image(s), for example obtained prior to the procedure, where the anatomical structure region(s) does not depict the feature (e.g., no tumor is present, the liver is before resection, the bone has a fracture), and a post-feature image(s), for example obtained after the procedure, where the anatomical structure region(s) depicts the features (e.g., tumor is present, the liver after resection, the fracture of the bone has been surgically repaired). The extracted real anatomical structure regions are preserved, for example, absolute distances and/or relative distances between visual features of the extracted real anatomical structure regions are maintained. The synthetic image(s) is generated from the extracted real anatomical structure region(s) and from a synthetic human anatomical structure region (e.g., tissue and/or organs). Attributes of the real anatomical structure that are easily adapted by the real anatomical structure (referred to herein as "adaptable attributes"), may be preserved in the synthetic image. Exemplary adaptable attributes include: body pose, blood flow phase (e.g., arterial, venous), limb pose, muscle contraction or relaxation, and lighting. Multiple synthetic images may be generated corresponding to multiple real images of the same real human anatomical structure, such as corresponding to the pre-feature image(s) and the post-feature image(s). The preserved real anatomical structure region extracted from the real image replaces the corresponding synthetic region of the synthetic human anatomical structure. The identity of the real human is non-determinable from the anonymous images(s), for example, features of the anatomical structures depicted in the synthetic image cannot be used to determine the identity of the real human. In another example, PHI cannot be extracted from the synthetic image depicting the anatomical structure. The anonymity of the synthetic image with respect to the real image may be an objective measure, for example, an outcome by a trained machine learning indicates that the synthetic image and the real image are non-similar (e.g., a similarity value is below a threshold) and/or that the synthetic image and the real image are of two different identities. It is noted that the objective measure helps ensure that a human observer does not recognize the identity of the syndetic image as that of the real person depicted in the real image. In another example, the object measure may help ensure that the synthetic image does not carry PHI of the real subject, for example, PHI according to a requirement such as PHI above a threshold. Synthetic images that are verified to preserve the identity of the real human (e.g., according to the object measure) and/or verified to exclude PHI may be included in the dataset.

An aspect of some embodiments of the present invention relates to systems, methods, an apparatus, and/or code instructions for generating at least one synthetic fundus image that fuses actual patient's data (e.g., morphological findings) while preserving patient's anonymity. The fundus image may be captured using one or imaging modalities, for example, a camera capturing an image in the visible light spectrum, optical coherence tomography (OCT), ultrasound (e.g., A-scan, B-scan), and the like. A real fundus region(s) is extracted and/or preserved from real image(s) of a real human fundus. Anonymous fundus image(s) that include a synthetic human fundus and the preserved real fundus region(s) is generated. An identity of the real human fundus is non-determinable from the anonymous fundus image(s).

Optionally, one or more defined attributes are extracted and preserved from the real image(s). The defined attribute(s) include a physical feature(s) extracted from the real image(s). Exemplary defined attributes include: contour of the anatomical structure (e.g., lips, jawline, nose, heart), measurements of the anatomical structure (e.g., length of bone, presence of tumors, anatomical abnormalities, relationship between anatomical structure landmarks, and skin pigment. The anonymous image(s) is generated while creating the respective synthetic anatomical structure defined attribute of each synthetic image with the corresponding real anatomical structure defined attribute(s). The term "real anatomical structure region" used herein may sometimes be interchanged with the term "real anatomical structure region and/or defined attributes".

At least some implementations of the systems, methods, apparatuses, and/or code instructions (stored on a memory and executable by one or more hardware devices) described herein address the technical problem of providing images that preserve privacy of a human. Another human observer viewing the image is unable to determine the identity of the human depicted in the image or to distinguish it from an original image of a human. The images may be part of a dataset that depicts certain features which are of interest. The dataset may be used, for example, for teaching and/or researching the features (e.g., teaching physicians to recognize tumors, researching certain congenital abnormalities). In another example, the dataset may be used for training another machine learning model (e.g., neural network) to automatically detect the feature in new images, for example, using mammogram images depicting breast cancer to train a neural network to detect breast cancer, and/or using fundal images depicting abnormalities to train a neural network to automatically detect the abnormalities. The technical problem is that even though only a portion of the anatomical structure is shown which may exclude the face, and even when the portion of the anatomical structure is interior to the body, an unprocessed image may reveal the identity of the person. For example, an image that depicts a heart with a certain congenital defect and several cracked ribs may identify a person, for example, a celebrity that is known to have this congenital defect and which was recently in an accident in which the celebrity cracked several ribs. In another example, a fundal image that depicts a macular hole may be stolen and maliciously used to gain access to a secure site by fooling a fundal security scanner. In yet another example, an image of a chest of a woman that underwent mastectomy for breast cancer may depict a tattoo on the neck. The identity of the woman may be determined from the tattoo which is visible to external observers even if the face of the woman does not appear in the image.

Fundus images of the retina are an essential tool for diagnosing and monitoring a wide range of ophthalmologic conditions. These images typically contain sensitive patient information and are considered PHI, subject to privacy regulations such as HIPAA in the United States. As such, access to PHI is restricted to authorized healthcare providers and may require patient consent. Fundus images have been proposed as a potential biometric for patient identification due to their unique features and availability in medical records. However, the use of fundus images for identification purposes must be done in a manner that protects patient privacy and adheres to applicable regulations.

Existing solutions for protecting patient privacy while generating synthetic images typically use generative adversarial networks (GANs) to create new images that have no resemblance to the original image. However, this method often results in the loss of clinically relevant features and structures that could aid in the diagnosis and monitoring of ophthalmologic conditions.

At least some implementations of the systems, methods, apparatuses, and/or code instructions (stored on a memory and executable by one or more hardware devices) described herein address the aforementioned technical problem and/or improve upon the aforementioned existing solutions, by creating an anonymous image that includes a synthetic human anatomical structure region and preserves an anatomical structure region extracted from a real image of a real human anatomical structure. The privacy of the anonymous image may be verified such that an identity of the real human depicted in the real image of the real human anatomical structure is non-determinable from the anonymous image. For example, synthetic fundus images that preserve clinically relevant features from an original patient's image and structures and protect patient privacy are generated using at least some embodiments described herein.

At least some implementations of the systems, methods, apparatuses, and/or code instructions (stored on a memory and executable by one or more hardware devices) described herein address the technical problem of providing images depicting a pre and post treatment and/or procedure performed on a region of the anatomical structure, while preserving privacy of the real human depicted in the images. For example, plastic and Aesthetic Medicine is a visual-driven field, but professionals can't share results of their work due to privacy concerns and legal restrictions. Privacy limitations prohibit publication of medical aesthetic and plastic surgery results. The requirement to maintain privacy of the patients limits professionals' ability to publicize the results of their work and share it with other professionals and/or potential customers. Other examples of procedures that impact the anatomical structure include dental procedures, cosmetics, diets, fitness, hairstyles, piercings, tattoos, and makeup.

Yet other examples are of procedures that impact the interior and/or exterior of the anatomical structure(s), for example, organ transplant (e.g., kidney, liver, lung), repair of congenital heart defects, treatment of a tumor (e.g., resection, cryoablation, RF ablation, injection of drugs), resection of the anatomical structure (e.g., liver, lung), internal fixation of a bone fracture, and the like.

At least some implementations of the systems, methods, apparatuses, and/or code instructions described herein improve the technical field of image processing.

At least some implementations of the systems, methods, apparatuses, and/or code instructions described herein improve over existing approaches for preserving privacy of individuals depicted in images. For example, standard approaches are based on using photo editing software to blocking out, blacking out, and/or smudging pixels of certain anatomical structure features that enable recognition of the individual (e.g., eyes, eyebrows, tattoos, and scars) while the rest of the anatomical structure is maintained. Such standard approaches are manual, relying on the image editor's subjectivity to decide how to obscure the subject's identity. However, such standard approaches have drawbacks, for example: generating images with "noise" that distract the observer; the real person may still be recognizable, legal liability may remain due to privacy concerns, and clinically significant information may be removed which damages the perception of the clinical result. An additional drawback of the standard photo editing software approaches is that a person can reverse the computational process of the photo editing software to regenerate the original image of the original person, thereby nullifying the attempt at hiding the identity of the original person.

The solution to the technical problem, and/or the improvement to the technical field(s), and/or improvement over existing approaches, is based on generation of anonymous images that depict the region(s) of the anatomical structure of the real human being that underwent a procedure (e.g., medical treatment and/or other procedures as described herein), while preserving the privacy of the real human being. The anonymous images accurately depict the region of the anatomical structure before and after the procedure and/or medical treatment, while presenting a different anatomical structure of a synthesized person that does not exist, which prevents recognition of the real human that actually underwent the procedure and/or medical treatment. The anonymous images appear like a non-obscured image of a human, without blacked out and/or smudged pixels. The identity of the real person behind the generated anonymous images is thereby protected, using an automatic and/or objective and/or validated approach.

At least some implementations of the systems, methods, apparatuses, and/or code instructions described herein provide a solution to the above mentioned technical problem, and/or improve over existing approaches and/or improve the technical field, converting one or more images of a certain individual into a new set of corresponding anonymous images depicting a synthetic person (e.g., photo-realistic avatar (PRA)) that maintains one or more anatomical structure regions from the original image of the individual. The original identity of the certain individual cannot be restored and/or reconstructed from the corresponding anonymous image depicting the synthetic person with anatomical structure regions obtained from the original image of the real individual. The individual may have undergone a certain medical procedure (e.g., medical aesthetic, invasive surgery, minimally invasive surgery, non-invasive surgery, dental procedure) and/or treatment (e.g., dental, cosmetic, diet, fitness, hairstyle, piercing, tattoo, makeup), in which case the images of the individual depict pre-procedure and/or post-procedure states, and the anatomical structure regions depict the portions of the anatomical structure that were altered during the procedure. The generated anonymous images include the same clinically relevant characteristic of the original individual, without identifying the original subject that underwent the procedure and/or medical procedure. For example, the anonymous images depict the clinical outcome of the medical procedure (e.g., pre and post procedure, such as the nose before nasal reconstruction, and after nasal reconstruction) without the ability to identify the real identity of the individual from the generated synthetic person. The synthetic person depicted in the anonymous images may further maintain the same anatomical structure pose depicted by the real subject in the original images, for example, limb orientation, blood flow phase, and/or muscles flexed or relaxed. The synthetic person depicted in the anonymous images may further maintain the same major descriptive features as the real subject in the original images, for example, gender, age, skin color, anatomical structure shape, congenital deformations, anatomical abnormalities, and tissue that was operated on. Maintaining the same body pose and/or same major descriptive features improves accurate preservation of the anatomical structure region impacted by the medical procedure, which protects the real identity of the subject. For example, the changes to the retina of the real person as a result of a procedure and/or medical procedure (e.g., repair of macular hole) are accurately preserved in the synthetic person depicted in the anonymous images, while the identity of the real person is protected and cannot be determined or derived from the anonymous images. Moreover, the anonymous images may not be useable for passing biometric security systems using a stolen identity of the real human.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
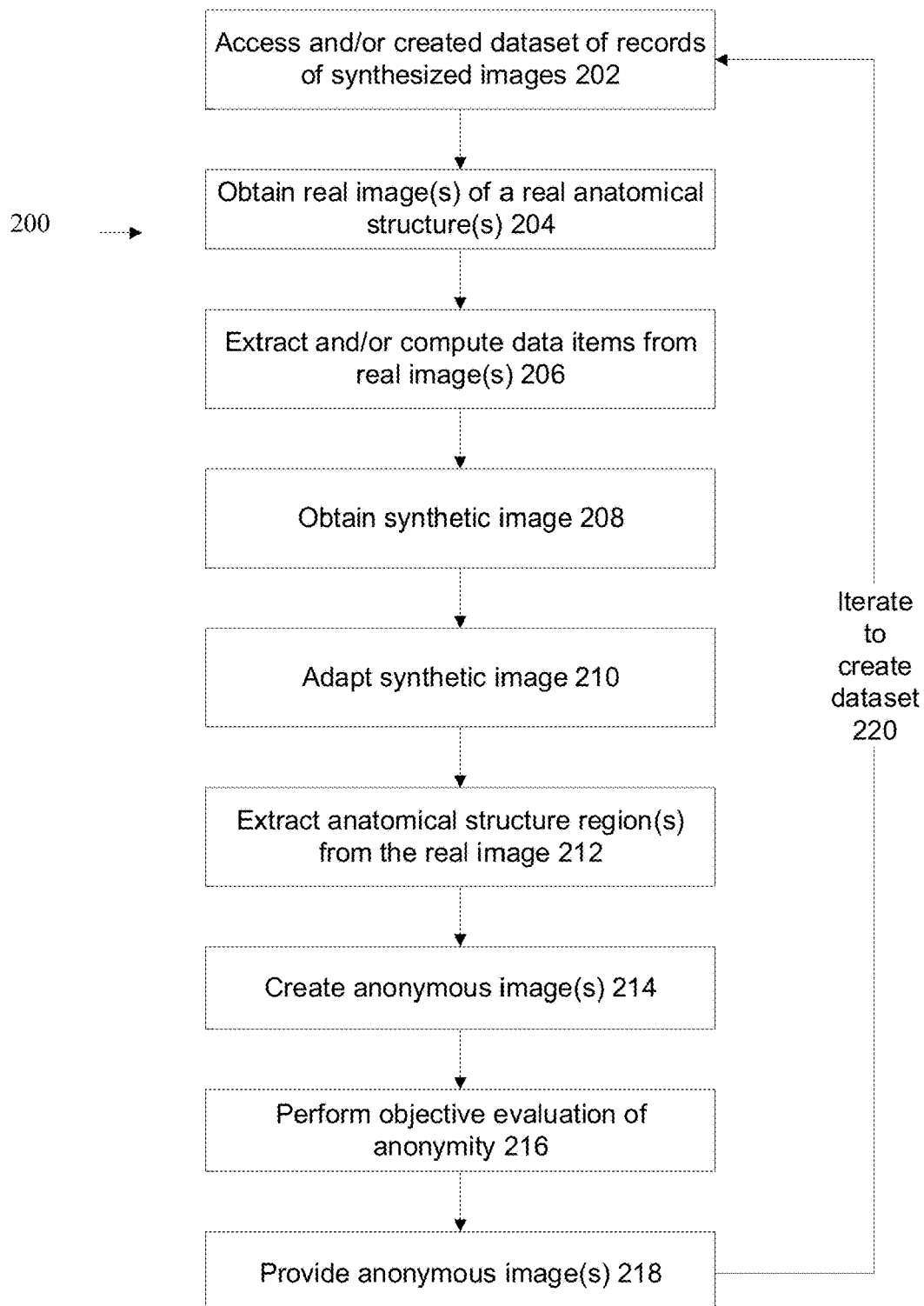
FIG. 2 is a flowchart of a method of generating one or more anonymous images that include a synthetic human anatomical structure and one or more real anatomical structure regions extracted and preserved from a real image of a real human, in accordance with some embodiments of the present invention.
Figure 3:
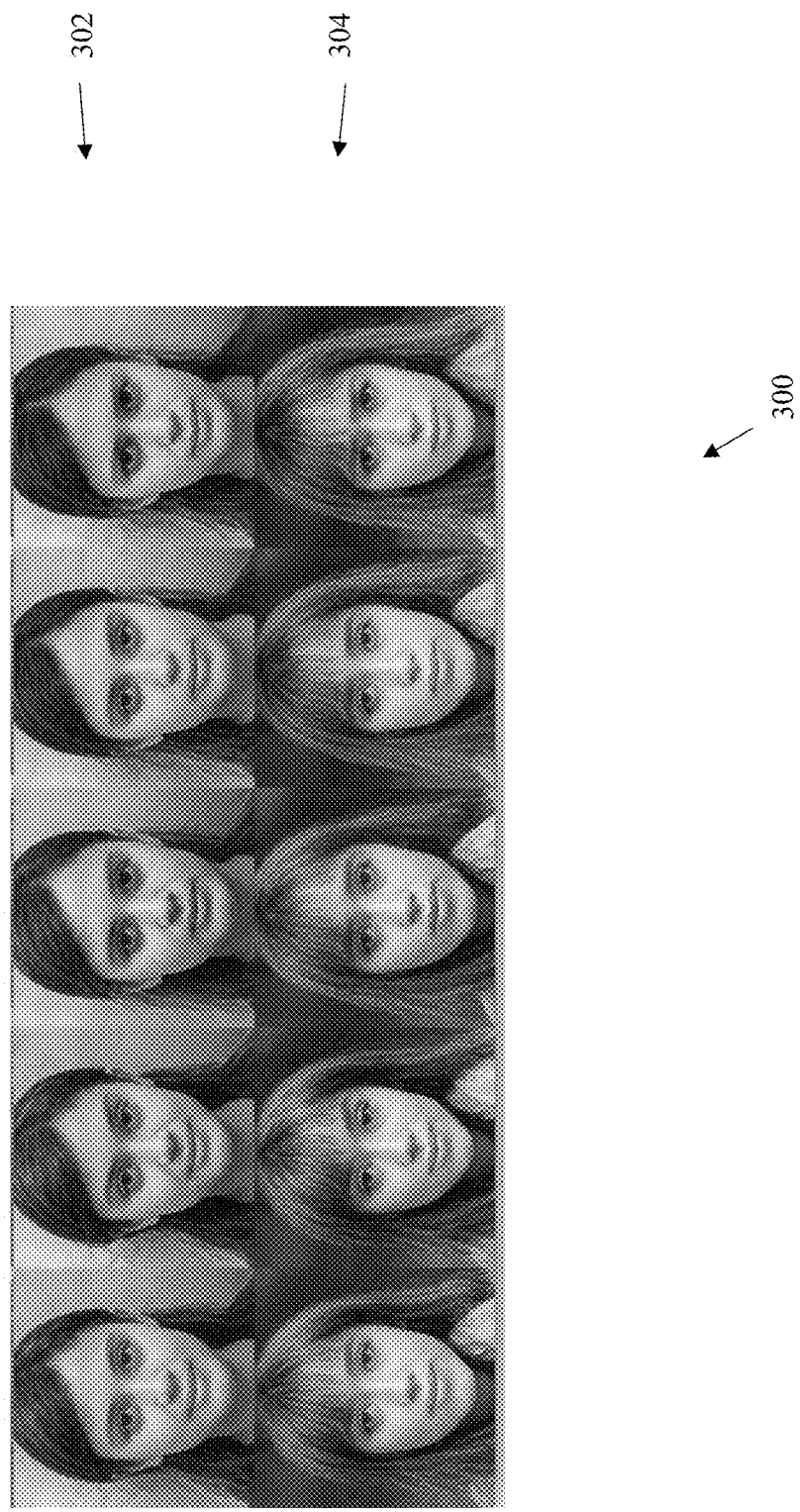
FIG. 3 includes real images of a real human anatomical structure and corresponding anonymous images that include a synthetic human anatomical structure and real lips of the real human face extracted from the real images, in accordance with some embodiments of the present invention.
Figure 4:
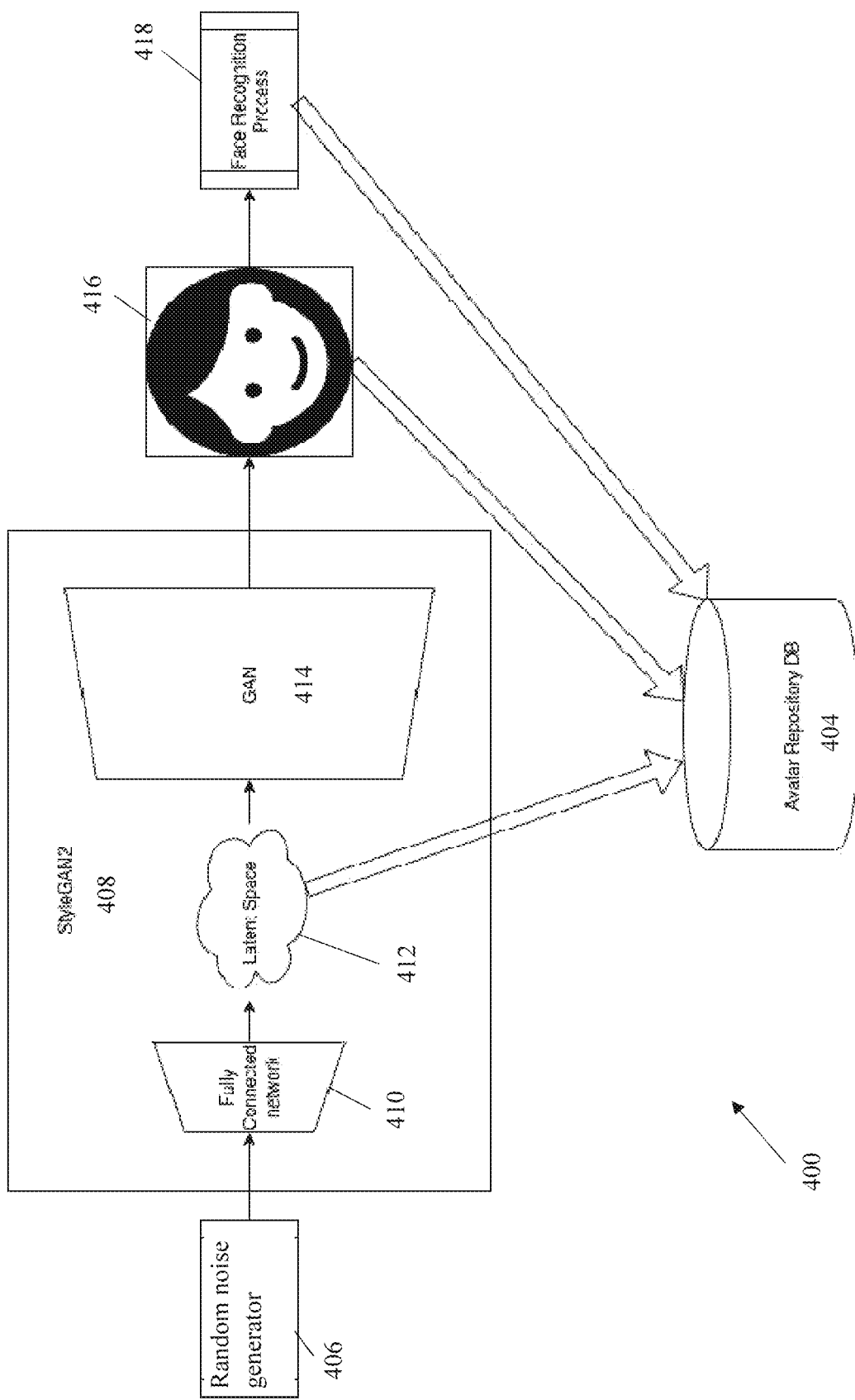
FIG. 4 is an exemplary dataflow for creating a record of an avatar repository dataset, in accordance with some embodiments of the present invention.
Figure 5:
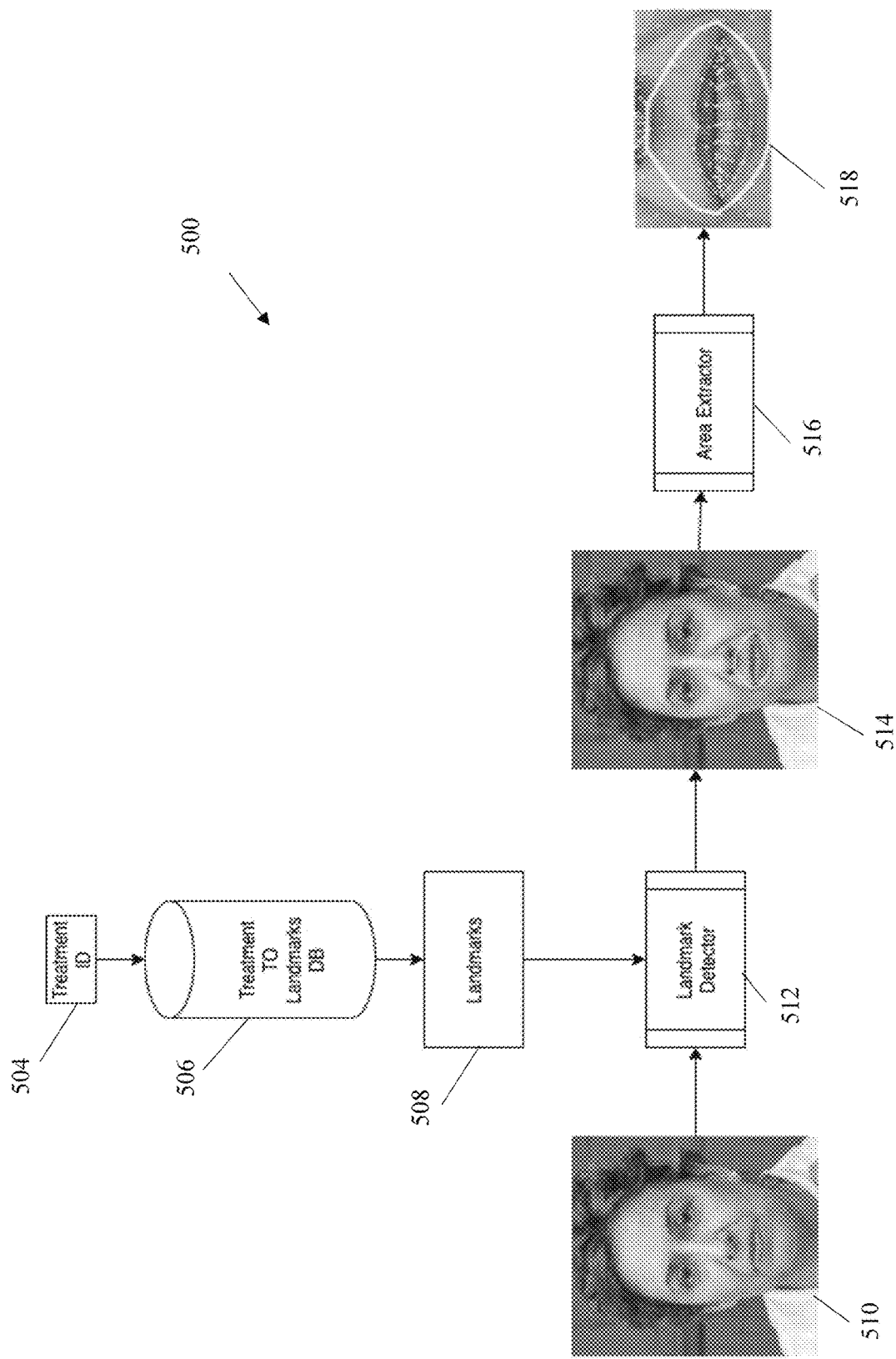
FIG. 5 is an exemplary dataflow for extracting an anatomical structure region from an image, in accordance with some embodiments of the present invention.
Figure 6:
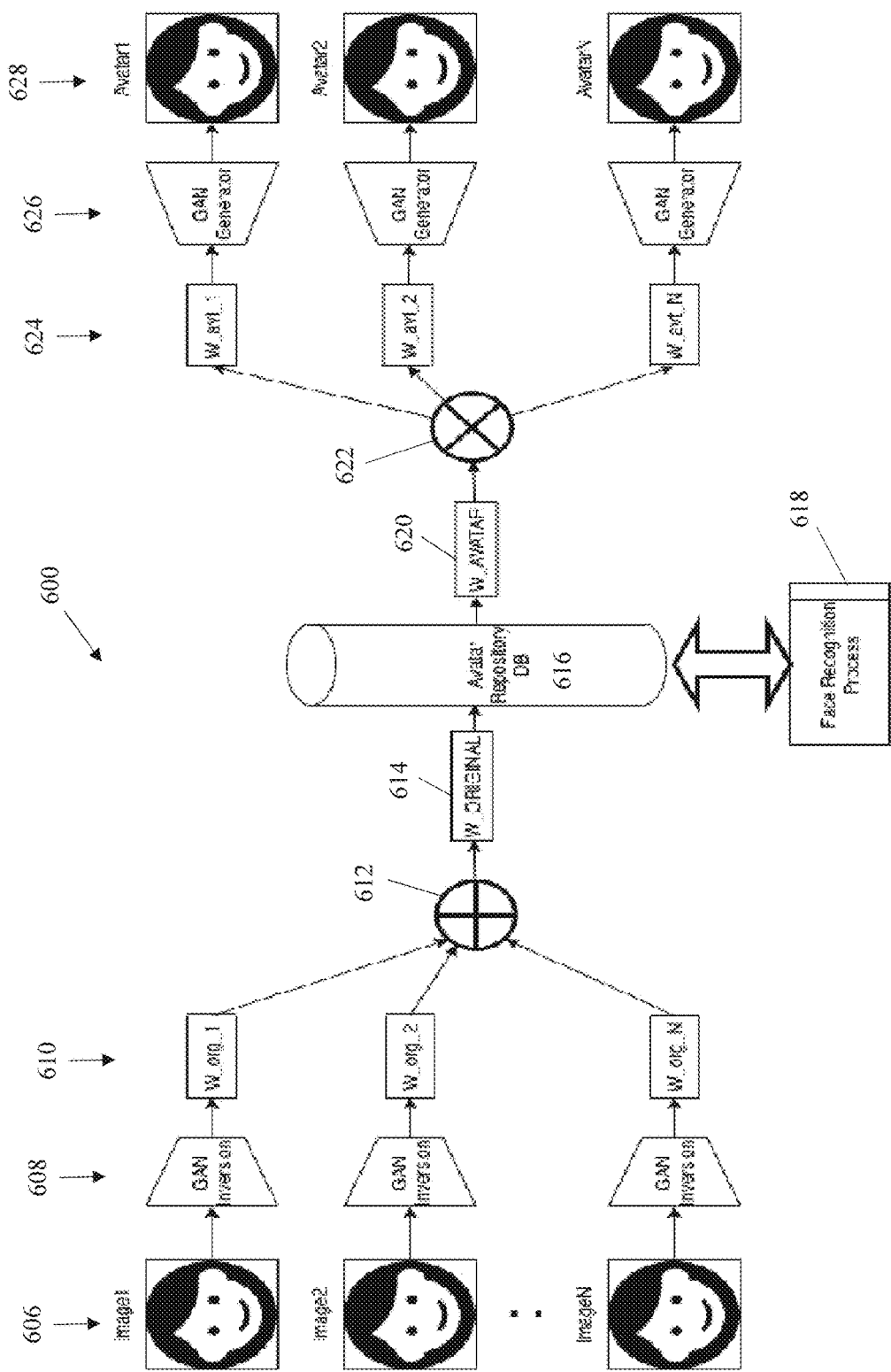
FIG. 6 is an exemplary dataflow for creating one or more synthetic images that correspond to one or more real images of a real person, in accordance with some embodiments of the present invention.
Figure 7:
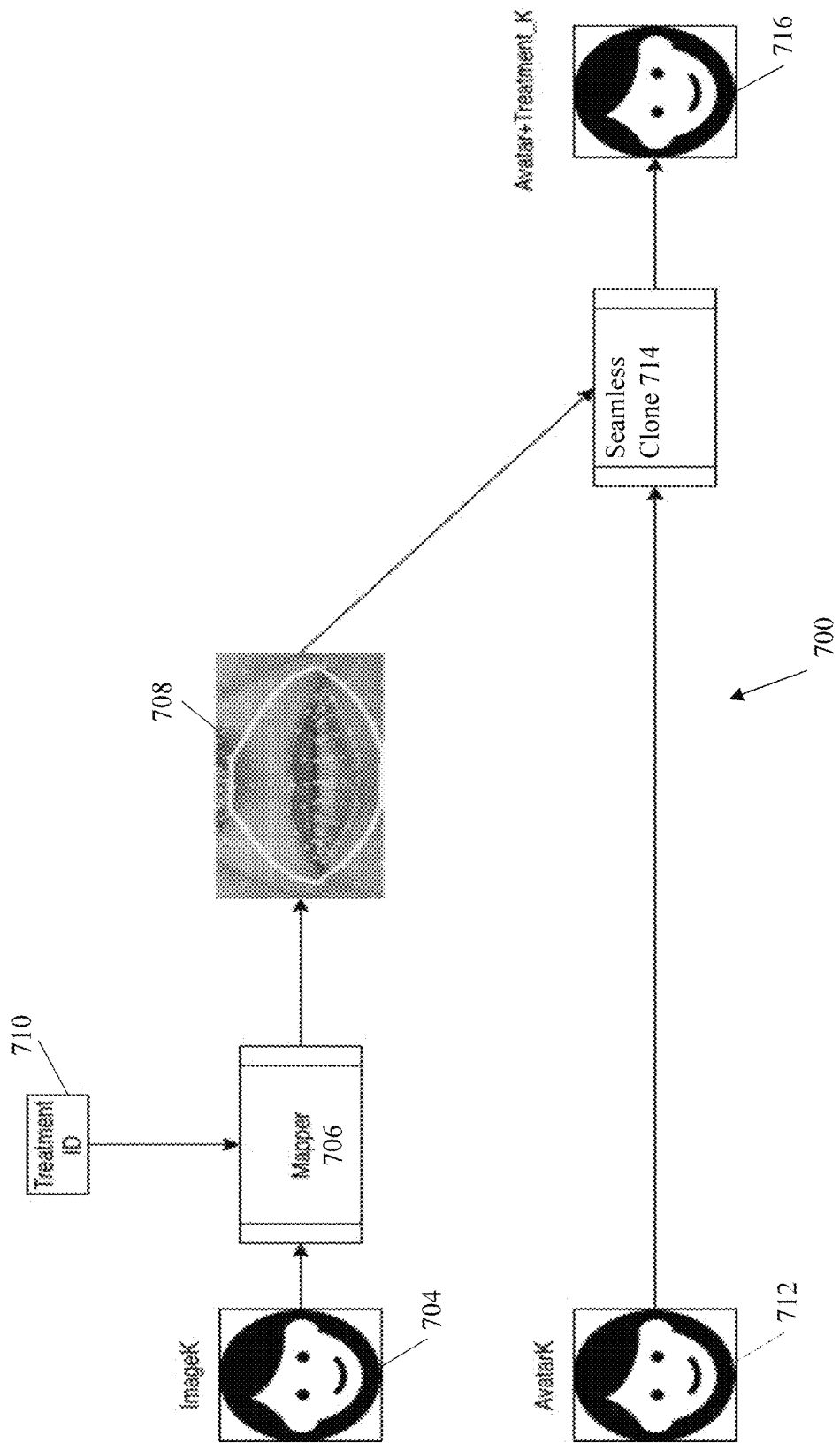
FIG. 7 is an exemplary dataflow for creating an anonymous image that includes a synthetic image and a real anatomical structure region (e.g., impacted by a procedure and/or medical treatment) extracted from a real image of a real person, in accordance with some embodiments of the present invention.

Reference is now made to FIG. 1, which is a block diagram of components of a system 100 for generating one or more anonymous images that include a synthetic human anatomical structure and one or more real anatomical structure regions extracted and preserved from a real image of a real human, in accordance with some embodiments of the present invention. Reference is also made to FIG. 2, which is a flowchart 200 of a method of generating one or more anonymous images that include a synthetic human anatomical structure and one or more real anatomical structure regions extracted and preserved from a real image of a real human, in accordance with some embodiments of the present invention. Reference is also made to FIG. 3, is a schematic 300 which includes real images 302 of a real human anatomical structure and corresponding anonymous images 304 that include a synthetic human anatomical structure and real lips of the real human anatomical structure extracted from the real images 302, in accordance with some embodiments of the present invention. Reference is also made to FIG. 4, which is an exemplary dataflow 400 for creating a record of an avatar repository dataset 404 (also referred to herein as dataset of synthetic images), in accordance with some embodiments of the present invention. Reference is also made to FIG. 5, which is an exemplary dataflow 500 for extracting an anatomical structure region from an image, in accordance with some embodiments of the present invention. Reference is also made to FIG. 6, which is an exemplary dataflow 600 for creating one or more synthetic images 604 that correspond to one or more real images 606 of a real person, in accordance with some embodiments of the present invention. Reference is also made to FIG. 7, which is an exemplary dataflow 700 for creating an anonymous image that includes a synthetic image and a real anatomical structure region (e.g., impacted by a medical treatment and/or procedure) extracted from a real image of a real person, in accordance with some embodiments.

System 100 may implement the acts of the method described with reference to FIGS. 2-7 by processor(s) 102 of a computing device 104 executing code instructions stored in a memory 106 (also referred to as a program store).

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

A centralized architecture. Computing device 104 executing stored code instructions 106A, may be implemented as one or more servers (e.g., network server, web server, a computing cloud, a virtual server) that provides centralized services (e.g., one or more of the acts described with reference to FIGS. 2-7) to one or more client terminals 108 over a network 110. For example, providing software as a service (SaaS) to the client terminal(s) 108, providing software services accessible using a software interface (e.g., application programming interface (API), software development kit (SDK)), providing an application for local download to the client terminal(s) 108, providing an add-on to a web browser running on client terminal(s) 108, and/or providing functions using a remote access session to the client terminals 108, such as through a web browser executed by client terminal 108 accessing a web site hosted by computing device 104. For example, images of real human anatomical structures, optionally depicting pre and post procedure and/or medical treatment states, are provided from each respective client terminal 108 to computing device 104. Computing device centrally generates anonymous images of synthesized anatomical structures corresponding to the received real human anatomical structures that depict the same anatomical structure region, which is optionally affected by the procedure and/or medical treatment, as described herein. Computing device provides each respective set of anonymous images to the respective corresponding client terminal 108, such as for presentation on a display and/or storage. The centralized architecture may improve utilization of processing resources in performing computationally intensive operations, such as using GAN 114A to compute synthetic images, using inverse GAN 114B to compute the latent vectors, and/or maintaining and/or generating large datasets such as dataset of records of synthetic images 114D, as described herein.

A local architecture. Computing device 104 may be implemented as a standalone device (e.g., kiosk, client terminal, smartphone) that include locally stored code instructions 106A that implement one or more of the acts described with reference to FIGS. 2-7. For example, images of real human anatomical structures, optionally depicting pre and post procedure and/or medical treatment states, captured by a user and uploaded to computing device 104, are used to locally generate anonymous images depicting the same anatomical structure region, optionally during the pre and post procedure and/or medical treatment states, as described herein. The local architecture may enable maintaining smaller datasets and/or personalized datasets, for example, specific to the user of the specific computing device 104. For example, a cosmetic surgeon that only handles cosmetic eye surgery may manage datasets specific to cosmetic eye surgery. In another example, a hairstylist may manage a dataset specific to hairstyles. In yet another example, an ophthalmologist that performs surgery on the retina may manage datasets specific to fundal images.

A combined local-central architecture. Computing device 104 may be implemented as a client terminal (e.g., standalone device) that include locally stored code instructions 106A that implement one or more of the acts described with reference to FIGS. 2-7, while other acts described with reference to FIGS. 2-7 are handled by a centralized server(s) 112. For example, GAN 114A and inverse GAN 114B may be locally stored and executed by computing device 104. Synthetic images may be obtained from dataset of records of synthetic images 114D managed centrally by server(s) 112. In another example, computing device 104 may provide centralized services by implementing one or more of the acts described with reference to FIGS. 2-7, while accessing another server(s) 112 for implementing other acts described with reference to FIGS. 2-7. For example, GAN 114A and inverse GAN 114B may be locally stored and executed by computing device 104 to provide centralized services to multiple client terminals 108. Synthetic images may be obtained by client terminal 104 from dataset of records of synthetic images 114D stored on server(s) 112.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-7 when executed by hardware processor(s) 102.

Computing device 104 may include a data storage device 114 for storing data, for example, GAN 114A, inverse GAN 114B, dataset of records of synthetic images 114C, treatment mapper 114D, and/or one or more ML models, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 116 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 includes and/or is in communication with one or more physical user interfaces 120 that include a mechanism for a user to enter data (e.g., manually select the real human images) and/or view the displayed results (e.g., the generated anonymous images). Exemplary user interfaces 120 include, for example, one or more of, a touchscreen, a display, a virtual reality display (e.g., headset), gesture activation devices, a keyboard, a mouse, and voice activated software using speakers and microphone.

Reference is now back to flowchart 200 of FIG. 2. At 202, a dataset of records may be accessed and/or created. The dataset of records enables a fast search for a synthetic image that is similar to a real image, as described herein. The dataset of records provides a wide range of synthetic images, increasing the likelihood that at least one synthetic image similar to the real image will be found. Creating and/or accessing the dataset of records in advance of obtaining the real image, i.e., in contrast to dynamically computing the similar synthetic image based on the real image, may be done, for example, where the GAN used to create the synthetic images creates images from random input, without the ability to control attributes of the synthetic images to enable creating a synthetic image having attributes similar to the real image but with a different identity.

Each record includes at least one synthetic image of a synthetic human anatomical structure. The synthetic image is used for generating the anonymous image, for example, as described with reference to 214 of FIG. 2. The synthetic image is created by feeding an input (e.g., random noise) into a GAN that converts the input (e.g., random input) into latent vectors within an intermediary latent space, for example, StyleGAN (e.g., described with reference to arXiv: 1912.04958), and BigGAN. The GAN generates the synthetic human anatomical structure according to the latent vectors.

Latent space may refer to an abstract multi-dimensional space containing feature values that cannot necessarily be interpreted directly, but which encodes a meaningful internal representation of externally observed events. For example, StyleGAN uses 18×512 dimensional latent space.

The synthetic images may be color images, optionally high resolution color images, which seem visually similar to real images captured by a camera, such as a CMOS, CCD, red green blue (RGB) sensor, or another standard image sensor. The image may be, for example, of the surface of the skin, and/or inside the body, such as of an organ such the retina, captured during a fundus photography, or colonoscopy, bronchoscopy, and the like. Alternatively or additionally, the synthetic images may be visually similar to images captured by other imaging modalities, which may captured images of the exterior and/or interior of the body, for example, 2D x-rays, computerized tomography (CT), magnetic resonance imaging (MM), ultrasound, positron emission tomography (PET), mammography, bone scan, and the like.

Each record may further include the latent vectors from which the synthetic image is created. Optionally, each record includes the latent vectors and excludes the synthetic image—the synthetic image may be generated from the latent vectors, such as from latent vectors which are adapted to obtain visual features corresponding to the real image, as described herein.

Each record may further include a characteristic profile of the synthetic anatomical structure depicted in the synthetic image. The characteristic profile may be obtained as an outcome of feeding the synthetic image of the synthetic anatomical structure into a machine learning model trained for recognizing anatomical structures and/or detecting specific anatomical structure attributes. The characteristic profile may be represented, for example, as metadata. The characteristic profile may include one or more of the following attributes: age, gender, ethnicity, skin color, anatomical structure shape, anatomical structure contour, relationship between anatomical structure landmarks (also referred to herein as anatomical landmarks), head position, body hair, presence of glasses, state of eyes, state of ears, state of mouth, state of nose, body pose, clinical abnormalities (e.g., aneurysm), anatomical variations (e.g., variation in structure of arterial tree), surgical repairs, and congenital malformations, and other defined attribute(s) that include a physical feature(s) extracted from the real image(s). Exemplary defined attributes include: contour of tissue and/or anatomical structure (e.g., lips, jawline, nose, heart, lung, liver, bone), relationship between anatomical structure landmarks, and skin pigment.

Attributes of the characteristic profile may be obtained, for example, using an ML model trained to generate an outcome of attribute(s) in response to an input of an image of an anatomical structure, such as an anatomical structure recognition ML model, for example, AWS Rekognition, for example, accessible at https://aws(dot)amazon(dot)com/rekognition/.

Alternatively, no dataset of records is created and/or accessed. Rather, the synthetic image may be dynamically created in response to an input of the real image.

A large number of synthetic images may be created, to correspond to the large number of visually different people, as represented by a large number of anatomical structure attributes. For example, at least about 10000, 50000, 100000, 200000, 500000, or greater. The large number of synthetic images helps ensure that for any real input image of a real anatomical structure, at least one corresponding synthetic image of a synthetic image is found.

An exemplary process for generating the records of the synthetic image dataset is described with reference to FIG. 4.

At 204, one or more real images depicting a real anatomical structure of a real human are obtained and/or accessed. The images may be obtained, for example, as individual still photos, and/or extracted as frames from a video.

In the case of two or more real images, the two or more real images are of the same real anatomical structure. The two or more real images may depict different states of the same real anatomical structure, for example, different muscle flexion or contraction, different phases of blood flow, different body expressions, different emotions, and/or different poses.

Optionally, the real anatomical structure region(s) has been modified by a procedure. The two or more real images may depict the real anatomical structure region(s) in the pre-procedure state before the modification, and in the post-procedure state after the modification. Examples of procedures include: medical aesthetic procedure, dental procedure, plastic surgery, cosmetic, diet, fitness, hairstyle, piercing, tattoo, makeup, surgical repair (e.g., fixation of fracture, repair of congenital heart defect), surgical excision (e.g., tumor removal, liver lobe, lung lobe, portion of colon), surgical transplant (e.g., kidney, liver), cryotherapy, ablation, and laser treatment (e.g., on the retina).

At 206, data item(s) is extracted and/or computed from the real image(s). One or more data items may be extracted and/or computed:

Optionally, a set of real latent vectors is computed for each one of the real images (or for the real image in the case of a single image). The real latent vectors are in the same latent space as the pretrained GAN used to create the synthetic images. The real latent vectors may be computed by applying a GAN inversion approach to the real image(s). The GAN inversion approach corresponds to the pretrained GAN used to create the synthetic images. Exemplary GAN inversion approaches include InterFaceGAN (e.g., described with reference to arXiv:2005.09635), Pixel2Style2Pixel [pSp] (e.g., described with reference to arXiv:2008.00951), and encoder4editing [e4e] (e.g., described with reference to arXiv:2102.02766).

In the case of multiple real images, an aggregated set of real latent vectors (e.g., a single set of real latent vectors) is computed from the multiple sets of real latent vectors. The aggregated set of real latent vectors may be computed, for example, as an average of the real latent vectors computed for the multiple images.

Alternatively or additionally, a characteristic profile of the real human anatomical structure depicted in the real image(s) is extracted. The characteristic profile may be extracted for one of multiple real images. The characteristic profile may be extracted for each of multiple real images, and aggregated into a single characteristic profile, for example, by performing a union operation. The characteristic profile may be represented as metadata. The process of obtaining the characteristic profile for the synthetic images described with reference to 202 may be applied to obtain the characteristic profile for the real images.

Alternatively or additionally, visual features for preservation are identified. The identified visual features help preserve the real anatomical structure region extracted from the real image, when incorporated into the synthetic image to create the anonymous image. The visual features help ensure a smooth integration of the real anatomical structure region into the synthetic image to obtain a life-like anonymous image, without abnormalities and/or artifacts.

Optionally, one or more defined attributes are extracted and preserved from the real image(s). The defined attribute(s) include a physical feature(s) extracted from the real image(s). Exemplary defined attributes include: contour of tissue and/or anatomical structure (e.g., lips, jawline, nose), relationship between anatomical structure landmarks, skin pigment, and/or others as described herein. The visual features may include defined attribute(s) described herein.

The visual features may include absolute and/or relative descriptions between features of the anatomical structure, such as anatomical landmarks of the anatomical structure (also referred to herein as anatomical structure landmarks). The visual features may include measured relationships between anatomical landmarks of the anatomical structure. For example, distance between corners of the lips, distance between tip of nose and eyes, distance between eyes, and the like. Other visual features are as described herein.

The procedure may be mapped to anatomical structure regions and/or defined attributes impacted by the procedure, for example, by a mapping dataset, and/or a trained machine learning model. For example, a training dataset is created that includes an image of an anatomical structure of a person, a label indicating the procedure that the person underwent, and a ground truth of anatomical structure landmarks impacted by the procedure. For example, a domain expert in the procedure uses a graphical user interface (GUI) to label and/or mark the anatomical structure regions on the image, such as an overlay and/or by "drawing" thereon using the GUI, such as marking X's on the anatomical structure landmarks and/or drawing a boundary around the anatomical structure region(s). For example, for a rhinoplasty surgical procedure, the anatomical structure region includes the nose. In another example, a tumor may be demarcated. Visual features may include distances between anatomical landmarks of the nose, and/or distances between anatomical landmarks of the nose and other anatomical landmarks such as eyes and lips, length of bones, compression of spine, congenital malformations (e.g., arteriovenous malformation), anatomical variations (e.g., branching in arterial tree), and/or clinical abnormalities (e.g., aneurysm). The ML model may be trained on such a training dataset. An indication of the procedure may be provided, for example, entered by a user and/or real from a metadata tag of the image.

The procedure may be mapped to anatomical structure landmarks that define the anatomical structure region(s). For example, multiple anatomical structure landmarks may define the boundary of the anatomical structure region(s).

Optionally, the visual features are defined by the procedure. For example, the procedure is further mapped to the visual features by the mapping dataset and/or the trained ML model. The visual features may include measured relationships between anatomical landmarks of the real human anatomical structure impacted by the procedure. The visual features may be automatically computed from the ground truth markings of the training dataset, for example, absolute and/or relative distance between the anatomical structure landmarks are computed and preserved.

The visual features and/or anatomical landmarks may be found, for example, by a trained ML model, and/or feature extraction process such as At 208, a synthetic image that has a characteristic profile similar to the characteristic profile of the real image is obtained. The synthetic image that has the characteristic profile similar to the characteristic profile of the real image may be referred to herein as a fully synthetic image, to differentiate it from the synthetic image (also referred to as the anonymous image) that includes the portion of the real image. The synthetic human anatomical structure visually depicts a characteristic profile of the real human as exhibited by a match to the real human anatomical structure of the real image. The synthetic person depicted in the synthetic image looks different than the real person depicted in the real image (i.e., the identity of the real person cannot be determined from the synthetic image), but has a similar characteristic profile, for example, similar gender, similar age, similar skin color, similar anatomical structure features, similar length of bones, similar effects of osteoporosis on bone density, congenital malformations (e.g., arteriovenous malformation), anatomical variations (e.g., branching in arterial tree), and/or clinical abnormalities (e.g., aneurysm), and the like.

The attributes that may be matched may be static attributes that do not vary between different real images of the same person, since they are inherent to the actual real person, such as gender, age, weight, and skin color.

Other attributes of the characteristic profile, which are adaptable attributes, may vary between different real images of the same person, since the person may easily change them, for example, expressed emotions, state of mouth (e.g., smiling), eye position, head pose, body pose (e.g., of arms, torso, legs), flexing or relaxation of muscles, blood flow phases (e.g., arterial, venous), and lighting. The adaptable attributes are not necessarily matched. The adaptable attributers depicted in the synthetic image may be adapted to match the adaptable attributes of the real image, for example, as described with reference to 210.

The synthetic image may be obtained from the dataset described with reference to 202, by searching records.

The search may be performed for records that have metadata representing the characteristic profile of the synthetic image of the respective record, that matches (or closely matches) the characteristic profile of the real image. Matches may be found, for example, when a highest number of attributes of the characteristic profiles are matched. Attributes of the characteristic profile may be weighted, with the matching record having a highest matching score computed using the weighted attributes.

Alternatively or additionally, the search is found by matching the set of real latent vectors for the real image, and/or the aggregated set of real latent vectors for multiple images, to latent vectors of records. The record with the most similar latent vectors is found. The most similar latent vector may be found, for example, by finding the record having latent vectors that have a closest Euclidean distance to the real latent vectors and/or aggregated latent vectors. Other measurements for computing similarity between two vectors (or two sets of vectors) may be used to find the closest record.

Alternatively, in some embodiments, the synthetic image is dynamically created to have a characteristic profile that is similar to the characteristic profile of the real image, for example, by adjusting parameters of the GAN.

At 210, the synthetic image may be generated and/or adapted to match one or more adaptable attributes of the characteristic profile of the real image, for example, body pose (e.g., of arms, torso, legs), blood flow phases (e.g., arterial, venous), flexing or relaxation of muscles, head position, eye position, lighting, and expressed emotions. Adapting the synthetic image to depict the adaptable attributes of the real image helps ensure a more realistic and life-like integration of the extracted real anatomical structure region with the synthetic image to create the anonymous image, for example, by avoiding requiring extra manipulation of the real anatomical structure region to "fit" different head orientations, and/or by preventing fake looking stitched regions due to improper "fit" between the real anatomical structure region and synthetic image having different orientations.

The synthetic image may be generated and/or adapted to match one or more defined attributes extracted from the real image(s).

An exemplary approach for adapting the synthetic image to match the adaptable attributes of the real image is now described. For each respective real image, a respective set of real latent vectors are computed. The real latent vectors are within the latent space of a pretrained generative adversarial network (GAN) using a GAN inversion approach, which correspond to the latent space and GAN used to create the synthetic images. Each respective set of real latent vectors is analyzed to identify data representing the adaptable attributes depicted by the respective real image, for example, as adjustable parameters. For each respective synthetic image depicting the synthetic human anatomical structure, a respective set of synthetic latent vectors are computed within the latent space of the pretrained GAN using the GAN inversion approach used for the real images. It is noted that the synthetic latent vectors may already exist in the record of the synthetic image. Each respective set of synthetic latent vectors is adapted to include the data representing the adaptable attributes as depicted by the respective real image obtained by the analysis of the respective set of real latent vectors. Each respective synthetic image is reconstructed from a corresponding respective set of adapted synthetic latent vectors, by feeding into the GAN corresponding to the GAN inversion approach. Each anonymous image (also referred to herein as synthetic image), created as described with reference to 214, that includes the respective synthetic image reconstructed from the respective set of adapted synthetic latent vectors depicts the adaptable attributes depicted by the corresponding real image.

In the case of multiple real images of the same real person that vary by adaptable attributes, in the process described in the preceding paragraph, multiple sets of synthetic latent vectors are computed. Each respective set of synthetic latent vectors is computed by adapting the set of synthesized latent vectors of the similar record according to a difference between the aggregated set of real latent vectors and a certain set of real latent vectors computed for a certain real image. The difference represents the data indicating the adaptable attributes that vary between the real images. Each respective synthetic anatomical structure of each respective anonymous image is created from the respective adapted set of synthetic latent vectors.

An exemplary approach for generating adapted synthetic images is described with reference to FIG. 6.

At 212, one or more real anatomical structure regions are extracted from the real image of the real human anatomical structure, for example, arm, leg, chest, pelvis, breast, lung, heart, brain, bone, colon, fundus. Extraction may be performed, for example, by applying a mask to the real image to include the desired pixels of the anatomical structure region(s) and exclude pixels that do not belong to the anatomical structure region(s).

The anatomical structure region(s) for extraction may be identified based on the mapping of the procedure using the mapping dataset, as described herein.

The anatomical structure region(s) may be extracted based on the corresponding set of anatomical structure landmarks that define the anatomical structure region(s), as described herein. The anatomical structure landmarks may be found, for example, by a feature finding process that finds the anatomical structure landmarks on the image.

For example, for a forehead Botox treatment, the original pixels of the anatomical structure area above the brow and below the hairline are extracted by masking the rest of the image. In another example, for a tumor which has been removed, the original pixels of the anatomical structure region surrounding the tumor are extracted by masking the rest of the image.

The anatomical structure regions are preserved, by maintaining the same adaptable attributes of the corresponding real image.

In the case of multiple images, the same corresponding anatomical structure region(s) is extracted from each real image. When the multiple images depict the pre-procedure and post-procedure states, extracting the same corresponding anatomical structure region(s) from the multiple images depicts the anatomical structure region(s) before the procedure and after the procedure, indicating the effect of the procedure on the anatomical structure region(s). Moreover, the adaptable attributes of the respective image which are expressed in the respective anatomical structure region(s) are preserved.

An exemplary process for extracting the anatomical structure region(s) is described with reference to FIG. 5.

At 214, one or more anonymous images, also referred to as synthetic images, are created. Each anonymous image includes the respective synthetic human anatomical structure and the respective extracted real anatomical structure region(s), which is preserved from the real image. The anonymous image includes the real anatomical structure region(s) preserved from the real image, which may depict the actual impact of the procedure on the anatomical structure region(s). The synthetic parts of the anatomical structure provide anonymity to the person whose real anatomical structure region(s) is preserved.

The anonymous image(s) may be generated while creating the respective synthetic anatomical structure defined attribute of each synthetic image with the corresponding real anatomical structure defined attribute(s).

In the case of multiple real images of the same real person, multiple anonymous images are created, for example, for depicting the pre-procedure state and the post-procedure state, indicating impact of the procedure on the anatomical structure region(s).

Each respective synthetic image depicting the synthetic human anatomical structure may be analyzed to find the anatomical structure feature landmarks that define the anatomical structure region(s). The anatomical structure region(s) of the synthetic image may be found using the approach used to find and extract the anatomical structure region(s) of the real image, as described herein.

Each respective anonymous image is generated by fusing the anatomical structure region(s) of the synthetic image and the real anatomical structure region(s) and/or defined attributes extracted from the respective real image. Optionally, each respective anonymous image is generated by replacing the anatomical structure region(s) of the synthetic image with the real anatomical structure region(s) and/or defined attributes extracted from the respective real image. The real anatomical structure region(s) may be segmented from the real image. The segmented portion may be inserted (e.g., copied) into the corresponding location of the synthetic image, and blended, for example, using a seamless stitching approach.

The anatomical structure region(s) may be replaced for the synthetic image which has been created and/or adapted according to the adaptable attributes, as described with reference to 210.

The synthetic anatomical structure and/or real anatomical structure region of the respective anonymous image may be adapted to preserve the visual features (e.g., measured relationships).

Optionally, the anonymous image is post-processed, to create a photo-realistic result, for example, using automated photo editing methods, such as Semantic diffusion (e.g., described with reference to https://arxiv(dot)org/pdf/2004(dot)00049(dot)pdf), Color Transfer (e.g., described with reference to https://www(dot)cs(dot)tau(dot)ac(dot)il/~turkel/imagepapers/ColorTransfer(dot)pdf), Seamless Cloning (e.g., described with reference to https://docs(dot)opencv(dot)org/4.5.1/df/da0/group_photo_clone(dot)html), Poisson Image Editing (e.g., described with reference to http://www(dot)irisa(dot)fr/vista/Papers/2003_siggraph_perez(dot)pdf), and similar industry standard approaches.

An exemplary approach for creating the anonymous image is described with reference to FIG. 7.

At 216, an objective evaluation of anonymity may be performed.

The objective evaluation may be performed to confirm that an identity of the real human anatomical structure is non-determinable and/or non-recognizable and/or non-reconstructable from the generated anonymous image. For example, using the following exemplary approach. Pairs of images are designated, where each pair includes one real image and one anonymous image corresponding to the real image, i.e., where the anonymous image includes the anatomical structure region extracted and/or preserved from the real image. The respective real image and the respective anonymous image of each respective pair are fed into a machine learning model trained to recognize anatomical structures or portion thereof (e.g., corresponding to the anatomical structure region). The ML model generates an outcome of a similarity value denoting an amount of similarity between the real image and the anonymous image.

The verification of anonymity, that the anonymous image does not depict the corresponding real human anatomical structure, is obtained when the similarity value is below a threshold.

Alternatively or additionally, a confirmation check is performed that all of the generated anonymous images depict the same synthesized person. The check may be performed by designating image pairs, wherein each image pair includes a respective combinatorial selection of two of the generated anonymous images, i.e., all possible pairs of the anonymous image are defined. Each respective image pair is fed into a machine learning model trained to recognize anatomical structures or portion thereof (e.g., corresponding to the anatomical structure region). The ML model generates an outcome of a similarity value denoting an amount of similarity between the pair of images. Verifying that the anonymous images depict the same identity of the same synthetic human anatomical structure is obtained, when all of the similarity values are above the threshold.

When the objective evaluation fails, another similar synthetic image may be obtained At 218, the generated anonymous images (also referred to herein as synthetic images) are provided, for example, presented on a display, stored on a data storage device, forwarded to another process (e.g., for analysis), printed, and/or forwarded to an external and/or remote device (e.g., server, storage, client terminal).

At 220, one or more features described with reference to 202-218 may be iterated. Each iteration may generate one or more anonymous images. Multiple anonymous iterations generated in multiple iterations may be included in a dataset, for example, for consulting, teaching and/or research. The dataset may be a training dataset for training another machine learning model (e.g., neural network), for example, training records are created, where each training record includes the anonymous image and a ground truth from the extracted and/or preserved real anatomical structure region, for example, a tumor, an aneurysm, and a congenital defect.

Attention is now directed back to FIG. 3, which includes real images 302 of a real human anatomical structure and corresponding anonymous images 304 that include a synthetic human anatomical structure and real lips of the real human anatomical structure extracted from the real images 302. Anonymous images 304 accurately depict the real lips, for example that underwent a medical treatment and/or procedure, while protecting the identity of the real human. The identity of the real human anatomical structure cannot be determined from anonymous images 304.

Attention is now directed back to FIG. 4, which is an exemplary dataflow 400 for creating a record of an avatar repository dataset 404 (also referred to herein as dataset of synthetic images), in accordance with some embodiments of the present invention. The records are designed to enable a fast search for candidate avatar images that correspond to features of a real image of a real human. The records may be designed to enable fast generation of anonymous images depicting a synthetic person that corresponds to the real image, using the avatar image of the records, and/or using the latent vectors of the records.

A random noise generator 406 generates Gaussian input (e.g., random noise) that is fed into a pre-trained latent-space based GAN 408, for example, StyleGAN2. The input is fed into a fully connected network 410, which converts the input into latent vectors within an intermediary latent space 412. The latent vectors may be included in the record. The latent vectors are fed into a GAN 414 which generates a photo-realistic synthetic image 416 of a synthetic person according to the latent vectors. The generated synthetic image may be included in the record. The generated synthetic image may be fed into an anatomical structure recognition process 418 (e.g., trained ML model, such as AWS Rekognition) that extracts features of the depicted synthetic anatomical structure, for example, gender, age, emotional impression, head position, skin color, and the like. The features may be included in the record, for example, as metadata. Optionally, the anatomical structure recognition process 418 (or another process) verifies images quality, for example, to ensure that the image is realistic and/or high quality.

Optionally, a large number of records are created, to depict a wide range of different people, of different combinations of features such as gender, age, emotional impression, head position, skin color, race, and the like. For example, at least 100000, or 200000, or 300000, or about 100000-300000, or 200000-500000, or other values. The random generation of images helps ensure that the images are synthetic and do not depict any real people, and/or that the images cover a wide range of different individuals.

Attention is now directed back to FIG. 5, which is an exemplary dataflow 500 for extracting an anatomical structure region from an image, in accordance with some embodiments of the present invention. Dataflow 500 may be used for extracting a real anatomical structure region from a real image. The real anatomical structure region is integrated within the synthetic person to generate anonymous images, which preserves the real anatomical structure region of the real person while protecting the identity of the real person using the synthetic person. The anatomical structure region may have undergone a medical procedure (and/or prior to undergoing the medical procedure). In such a case, the extracted anatomical structure region maintains clinical information for accurately depicting the impact of the medical procedure.

As used herein, the terms treatment and procedure may be used interchangeably, to indicate modification of the anatomical structure region(s) extracted and preserved from the real image, which is integrated with the synthetic image to create the anonymous image.

An indication of the medical treatment 504 that the real person underwent is obtained, for example, as a treatment ID. A treatment to landmark dataset 506 maps the treatment to multiple landmarks 508 on the anatomical structure that may be impacted by the treatment. Landmark dataset 506 may be defined, for example, based on medical expert input. A real image of a real person 510 is fed into a landmark detector 512 that generates an indication 514 of landmarks 508 identified on real image 510. Landmarks 508 define the treatment-impacted anatomical structure region, which may be a contour, defined by anatomical structure landmarks 508. Landmark detector 512 may be implemented as an industry-standard landmark detection process, for example, DLIB, MediaPipe, and the like. An area extractor 516 extracts one or more real anatomical structure regions 518 that may be impacted by the medical treatment, according to indication 514. The extracted real anatomical structure regions 518 are integrated (e.g., seamless stitching) within the synthetic image of the synthetic person to create the anonymous images, as described herein.

Attention is now directed back to FIG. 6, which is an exemplary dataflow 600 for creating one or more synthetic images 628 that correspond to one or more real images 606 of a real person, in accordance with some embodiments of the present invention. Synthetic images 628 depict a distinctly different identity than real images 606, but with similar important clinical characteristics such as gender, age, ethnicity, skin color. Each pair of real image 606 and synthetic image 628 is matched with the same anatomical structure expression, head position and projected emotion.

Each real image 606 is fed into a GAN inversion model 608 that computes a corresponding latent vector 610 (also referred to herein as a real latent vector), denoted W_org_k. The multiple latent vectors of the different real images are aggregated 612 into an aggregation latent vector 614, denoted W ORIGINAL, for example, an average of the latent vectors is computed. The aggregated latent vector 614 denotes an identity representation of the real person depicted in real image s 606. The aggregated latent vector 614 and/or a set of features extracted from real image(s) 606 (e.g., age, gender, skin color, ethnicity, head position, and the like) are used to select a corresponding record from avatar repository dataset 616. For example, a record that matches the set of features is identified. It is noted that there may be a large number of records, resulting in multiple matches. When multiple matches are found, one record may be randomly selected from the matching records. The synthetic image of the synthetic person may be evaluated by an anatomical structure recognition process 618 to determine whether a similarity with the real person depicted in real image(s) 606 is below a threshold (e.g., industry accepted recognition threshold). A similarity value below the threshold indicates that the synthetic person and the real person are visually different. I.e., the identity of the real person cannot be obtained from the synthetic image. The latent vector 620 (also referred to herein as a synthetic latent vector) of the matching record of the synthetic image is used to compute 622 multiple synthetic latent vectors 624 (denoted W_avt_N), each corresponding to a respective real image 606. The computed synthetic latent vectors 624 may be computed according to the following relationship:

$$W\_avt\_K = W\_AVATAR + (W\_org\text{-}K - W\_ORIGINAL)$$

Each respective synthetic latent vector 624 is fed into a GAN generator 626 which generates a respective synthetic image 628. Each synthetic image 628 depicts the same features as the corresponding real image 606, for example, in terms of age, gender, head position, and the like. The anonymous images are created using synthetic images 628, by including a real anatomical structure region (e.g., impacted by a medical procedure) extracted from the corresponding real image 606, as described herein.

Attention is now directed back to FIG. 7, which is an exemplary dataflow 700 for creating an anonymous image that includes a synthetic image and a real anatomical structure region (e.g., impacted by a medical procedure) extracted from a real image of a real person, in accordance with some embodiments. A real image of a real person 704 is fed into a mapper process 706 that extracts an anatomical structure region 708 based on landmarks, for example, as described herein such as with reference to FIG. 5. Anatomical structure region 708 may be impacted by a medical treatment 710, for example, denoted by a treatment ID. The extracted anatomical structure region 708 is integrated (e.g., seamlessly stitched) into the corresponding region of synthetic image (also referred to as AvatarK) 712 by a seamless clone process 714, to generate anonymous image (also referred to as Avatar+Treatment_K) 716. Synthetic image 712 includes the same features as real image 704, for example, generated using dataflow 600 described with reference to FIG. 6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GANs will be developed and the scope of the term GAN is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular forms "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating a dataset of synthetic images depicting an anatomical structure region, comprising:
    for each real image of a plurality of real images each depicting a real human anatomical structure:
        extracting and preserving at least one real anatomical structure region from the real image of the real human anatomical structure;
        generating a synthetic image comprising a synthetic human anatomical structure region and the preserved at least one real anatomical structure region;
        designating pairs of images, each pair including the real image and the synthetic image that includes the preserved at least one real anatomical structure region extracted from the real image;
        feeding the real image and the synthetic image into a machine learning model trained to recognize anatomical structure parts to obtain an outcome of a similarity value denoting an amount of similarity between the real image and the synthetic image,
        verifying that the synthetic image does not depict the real human anatomical structure when the similarity value is below a threshold;
        wherein an identity of the real human anatomical structure is non-determinable from the synthetic image; and
        including the verified synthetic image in the dataset.

2. The computer implemented method of claim 1, further comprising preserving at least one adaptable attribute of the anatomical structure of the real image in the synthetic image, wherein the at least one adaptable attribute is easily adapted by the real human anatomical structure.

3. The computer implemented method of claim 1, wherein segmenting comprises segmenting and preserving the at least one real anatomical structure region and at least one defined attribute from the real image, wherein the at least one defined attribute comprises a physical feature extracted from the real image.

4. The computer implemented method of claim 1, wherein generating the synthetic image comprises:
- computing, for each respective real image, a respective set of real latent vectors within a latent space of a pretrained generative adversarial network (GAN) using a GAN inversion approach;
- analyzing each respective set of real latent vectors to identify data representing at least one adaptable attribute;
- computing, for each respective synthetic image depicting the synthetic human anatomical structure, a respective set of synthetic latent vectors within the latent space of the pretrained GAN using the GAN inversion approach;
- adapting each respective set of synthetic latent vectors, to include the data representing the at least one adaptable attribute obtained by the analysis of the respective set of real latent vectors;
- reconstructing each respective synthetic image from a corresponding respective set of adapted synthetic latent vectors,
- wherein each synthetic image that includes the respective synthetic image reconstructed from the respective set of adapted synthetic latent vectors depicts the at least one adaptable attribute, as depicted by the corresponding real image, wherein the at least one adaptable attribute is easily adapted by the real human anatomical structure, the at least one adaptable attribute selected from a group consisting of: body pose, limb pose, blood flow phase, muscle contraction or relaxation, and lighting.

5. The computer implemented method of claim 1, further comprising:
- computing, for each respective real image of a plurality of real images of the same person, a respective set of real latent vectors within a latent space of a pretrained GAN using a GAN inversion approach;
- computing an aggregated set of real latent vectors from a plurality of sets of real latent vectors;
- searching a dataset of a plurality of records for a record having a similarity to the aggregated set of real latent vectors, wherein each record includes a set of synthetic latent vectors computed for a certain synthetic human anatomical structure,
- wherein the image of the synthesized anatomical structure created from the set of synthesized latent vectors of the similar record is used to generate the synthetic image.

6. The computer implemented method of claim 5, further comprising:
- computing a plurality of sets of synthetic latent vectors, each respective set of synthetic latent vectors computed by adapting the set of synthesized latent vectors of the similar record according to a difference between the aggregated set of real latent vectors and a certain set of real latent vectors computed for a certain real image, wherein each respective synthetic anatomical structure of each respective synthetic image is created from a respective set of synthetic latent vectors.

7. The computer implemented method of claim 1, wherein a fully synthetic image of the synthetic human anatomical structure used for generating the synthetic image is created by feeding random input into a GAN that converts the random input into latent vectors within an intermediary latent space, and generates the synthetic human anatomical structure according to the latent vectors.

8. The computer implemented method of claim 1, further comprising:
- extracting metadata from the real image, the metadata indicating a characteristic profile of the real human anatomical structure;
- accessing a dataset of synthetic images of synthetic human anatomical structures each associated with respective extracted metadata indicating a respective characteristic profile of the respective synthetic human anatomical structure;
- searching metadata of the synthetic images of the dataset for a similar match to the metadata of the real image, wherein the similar matching synthetic image is used for generating the synthetic image.

9. The computer implemented method of claim 1, further comprising:
- designating pairs of images, each pair including one real image and one synthetic image;
- feeding a respective real image and a respective synthetic image into a machine learning model trained to recognize anatomical structures to obtain an outcome of a similarity value denoting an amount of similarity between the real image and the synthetic image, and
- verifying that the synthetic image does not depict the real human anatomical structure when the similarity value is below a threshold.

10. The computer implemented method of claim 1, wherein the synthetic image comprises a plurality of synthetic images depicting the same synthetic human anatomical structure, and further comprising:
- designating a plurality of image pairs, each image pair including the respective combinatorial selection of two of the plurality of synthetic images;
- feeding each respective image pair into a machine learning model trained to recognize anatomical structures to obtain an outcome of a similarity value denoting an amount of similarity between the pair of images, and
- verifying that the plurality of synthetic images depict the same identity of the same synthetic human anatomical structure when all of the similarity values are above a threshold.

* * * * *